United States Patent [19]
Tello et al.

[11] Patent Number: 6,032,118
[45] Date of Patent: Feb. 29, 2000

[54] VIRTUAL PRIVATE NETWORK SERVICE PROVIDER FOR ASYNCHRONOUS TRANSFER MODE NETWORK

[75] Inventors: Antonio G. Tello, Garland; Margaret Hui, Dallas; Kim Holmes, Rowlett, all of Tex.

[73] Assignee: Northern Telecom Limited, Montreal, Canada

[21] Appl. No.: 08/769,649

[22] Filed: Dec. 19, 1996

[51] Int. Cl.[7] .............................. G06F 17/60; H04M 3/42; H04L 9/00
[52] U.S. Cl. ............................... 705/1; 379/212; 379/211; 705/40; 705/44; 380/21; 380/49
[58] Field of Search ............................ 380/21, 49; 705/1, 705/40, 44; 379/211, 212

[56] References Cited

U.S. PATENT DOCUMENTS

| | | | |
|---|---|---|---|
| 4,268,722 | 5/1981 | Little et al. | 370/338 |
| 4,604,686 | 8/1986 | Reiter et al. | 395/400 |
| 4,609,778 | 9/1986 | Franklin et al. | 379/246 |
| 4,756,020 | 7/1988 | Fodale | 379/112 |
| 4,839,802 | 6/1989 | Wonak et al. | 710/14 |
| 5,181,236 | 1/1993 | LaVallee et al. | |
| 5,504,744 | 4/1996 | Adams et al. | 370/232 |
| 5,509,062 | 4/1996 | Carlsen | 379/210 |
| 5,517,560 | 5/1996 | Greenspan | |
| 5,537,464 | 7/1996 | Lewis et al. | |
| 5,544,161 | 8/1996 | Bigham et al. | 370/397 |
| 5,579,308 | 11/1996 | Humpleman | 370/352 |
| 5,600,643 | 2/1997 | Robrock, II | 370/399 |
| 5,638,434 | 6/1997 | Gottlieb et al. | 379/203 |
| 5,650,994 | 7/1997 | Daley | 370/259 |
| 5,661,782 | 8/1997 | Bartholomew et al. | 379/88.18 |
| 5,724,417 | 3/1998 | Bartholemew et al. | 379/211 |
| 5,764,639 | 6/1998 | Staples et al. | 370/401 |
| 5,768,271 | 6/1998 | Seid et al. | 370/389 |
| 5,889,845 | 3/1999 | Staples et al. | 379/211 |

FOREIGN PATENT DOCUMENTS

| 0729256 | 8/1996 | European Pat. Off. . |
|---|---|---|

OTHER PUBLICATIONS

Chan, Hadama, & Stadler, *An Architecture for Broadband Virtual Networks Under Customer Control*, Apr. 15, 1996, pp. 135–144.

Bic, *Voice Peripherals in the Intelligent Network*, Jun., 1994, pp. 29–34.

Crocetti, Fratta, Gallassi, & Gerla, *ATM Virtual Private Networks: alternatives and performance comparisons*, May 1, 1994, pp. 608–612.

*Primary Examiner*—James P. Trammell
*Assistant Examiner*—Nicholas David Rosen
*Attorney, Agent, or Firm*—Haynes & Boone, L.L.P.

[57] ABSTRACT

A virtual private network service provider is used to transfer data over a data network to a final destination, with third-party billing. The method comprises the steps of: prompting the user at a data terminal to select a destination, password, and call type; sending a set-up message to the data network; selecting a virtual private network provider through the data network; the virtual private network provider giving an encryption key to the user, and then prompting the user for a password and a user identification; encrypting the password, and sending the user identification and the encrypted password to the virtual private network provider; the virtual private network provider decrypting the encrypted password, and verifying the password; the virtual private network provider providing an authorization code; and the data terminal transferring the data through the data network to the final destination, using the authorization code.

15 Claims, 6 Drawing Sheets

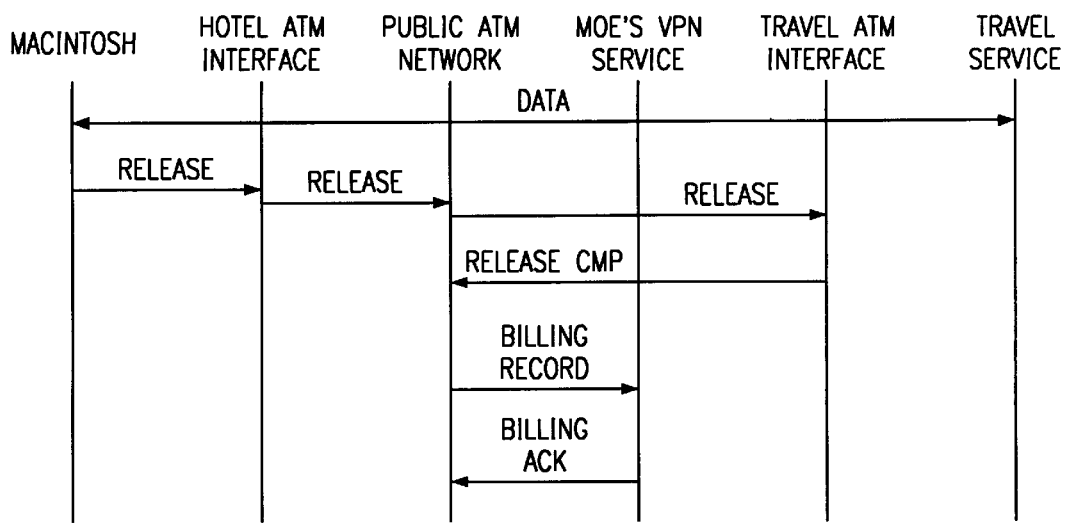
Fig. 4B
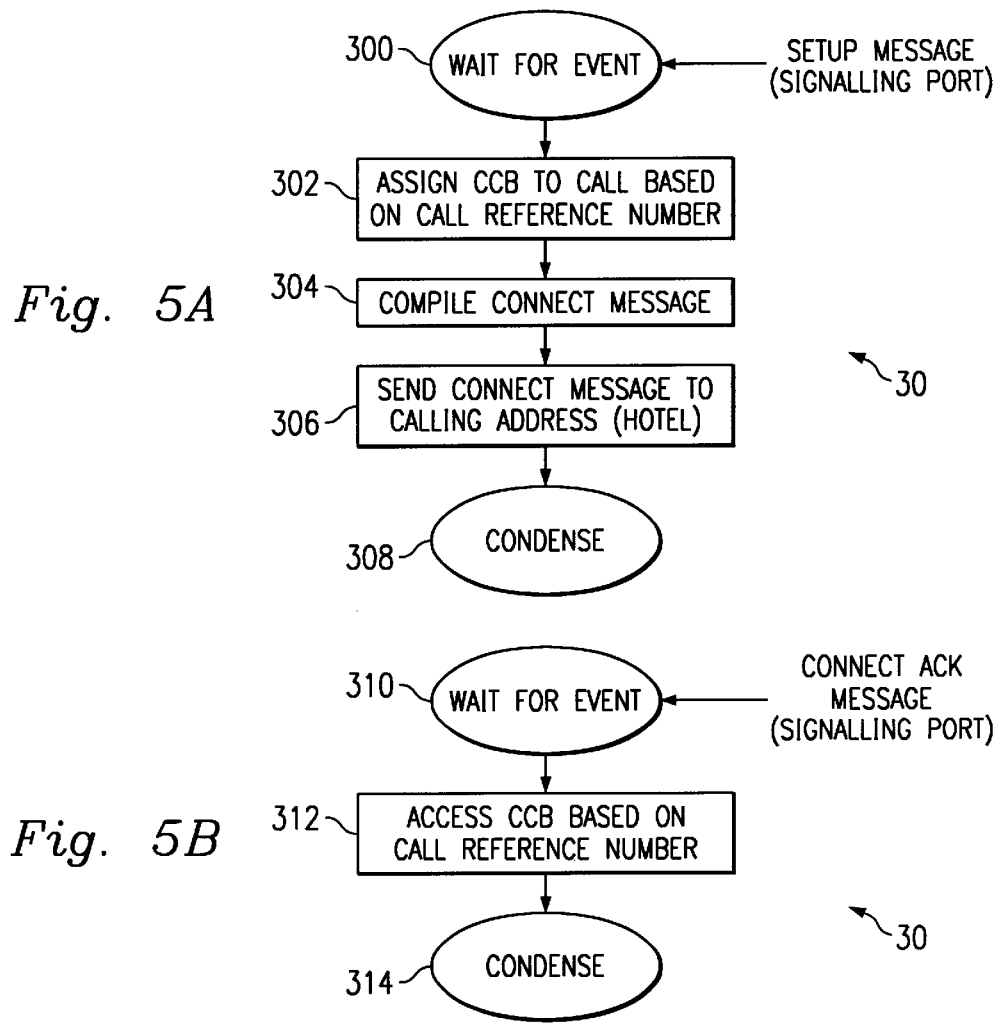
Fig. 5A
Fig. 5B

VIRTUAL PRIVATE NETWORK SERVICE PROVIDER FOR ASYNCHRONOUS TRANSFER MODE NETWORK

TECHNICAL FIELD

The invention relates generally to asynchronous transfer mode ("ATM") networks and virtual private networks ("VPN"), such as those offered by MCI and Sprint, and, more particularly, to a method of using a VPN to transfer data over a data network, with third-party billing.

BACKGROUND OF THE INVENTION

Telephone service providers offer third-party billing. For example, local and long distance telephone companies offer calling cards for third party billing.

VPNs exist to provide the sense of a private network among a company's locations. The lines/trunks of a VPN are actually shared among several companies, to reduce costs, yet to each company the VPN appears to be that company's own private network. However, a user at a remote data terminal, such as a portable computer in a hotel room, can not immediately charge his company for the access time to a data net, such as the Internet. Instead, his access time is charged to his hotel room, and so he must pay the inflated rates that hotels charge for phone service.

What is needed is a VPN service provider that offers remote access for users belonging to a VPN, user authorizations to prevent delinquent access into the VPN, and convenient third-party billing.

SUMMARY OF THE INVENTION

The present invention, accordingly, provides a system and method for using a VPN service provider to transfer data over a data network to a final destination, with third-party billing. The method comprises the steps of: prompting the user at a data terminal to select a destination, password, and call type; selecting a VPN through the data network; giving an encryption key to the user, and then prompting the user for a password and a user identification; verifying the password, and providing an authorization code to the user; and allowing the user to transfer the data through the data network to the final destination, using the authorization code.

In another feature of the invention, the method further comprises negotiating for more bandwidth for the user, and including within the authorization code a grant of additional bandwidth.

In another feature of the invention, the method further comprises encrypting the user's password, and sending the user identification and the encrypted password to the VPN service provider.

In another feature of the invention, the method further comprises a step of sending a set-up message to the data network.

In another feature of the invention, the method further comprises a step of the VPN provider decrypting the encrypted password.

A technical advantage achieved with the invention is that it shifts or defers costs from an end user to a bulk purchaser of data network services. Another technical advantage achieved with the invention is that it permits end users mobility while attaining a virtual appearance on a corporate intranet.

BRIEF DESCRIPTION OF THE DRAWINGS

FIGS. 4A and 4B are call flow diagrams, illustrating the preferred sequence of steps of the method of the present invention.

FIGS. 5A, 5B, 5C, 5D, 5E, and 5F comprise a flow chart depicting the method of the present invention, as implemented by switching control point software.

DESCRIPTION OF THE PREFERRED EMBODIMENT

Figure 1:
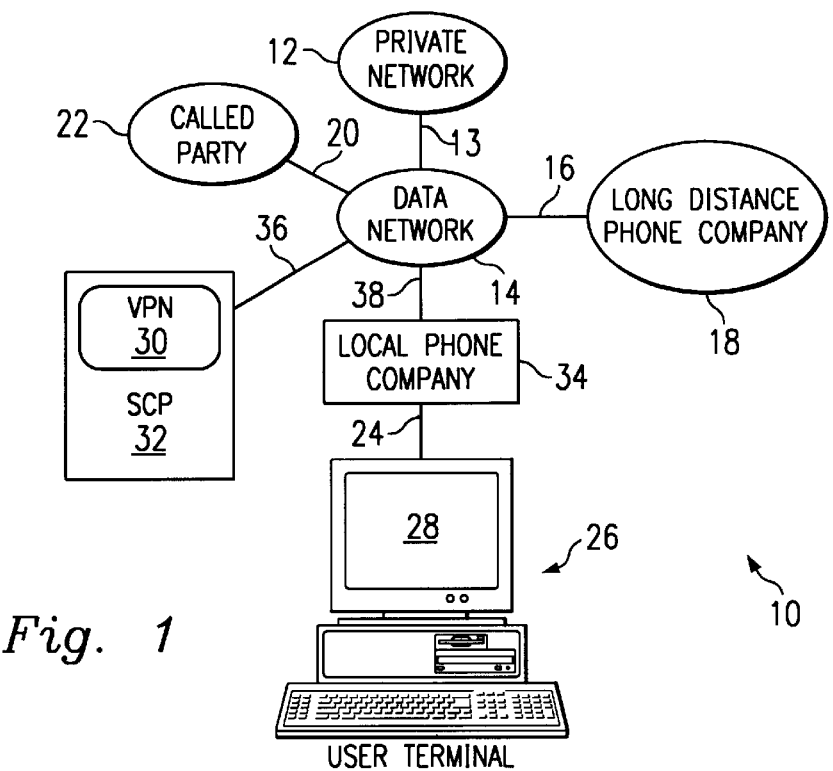
FIG. 1 is a system block diagram of a VPN service provider of the present invention.

In FIG. 1, the VPN service provider system of the present invention is designated generally by a reference numeral 10. The VPN service provider system 10 includes a VPN 12. The VPN 12 may be a corporate, government, association, or other organization's telephone/data line network. The VPN service provider system 10 also includes access lines 13 from the VPN 12 to a data network 14, such as the Internet, or an ATM network. The VPN service provider system 10 also includes access lines 16 from the data network 14 to a long distance phone company 18, such as AT&T, MCI, or Sprint. The VPN service provider system 10 also includes access lines 20 from the data network 14 to a called party 22, such as, for example, American Express reservations service. The VPN service provider system 10 also includes access lines 38 from the data network 14 to a local phone company 34 that connects to access lines 24 that connects to a remote user terminal 26, such as a portable computer in a hotel room. The user terminal 26 includes user application software 28, which provides the interface for the user to enter the number to be called, the user identification number, and the user's authorization code. The VPN service provider system 10 also includes VPN service provider software 30, located in a switching control point (SCP) device 32, which, in the preferred embodiment may be physically located anywhere. The SCP 32 connects to the data network 14 via access lines 36. One possible physical location for the SCP 32 is on the premises of a local phone company central switch building 34. However, even when located within the building 34, the SCP 32 connects to the local phone company switches via the data network 14. The local phone company switches connect to the data network 14 via access lines 38.

In an alternate embodiment, the VPN service provider software 30 and the SCP device 32 may be located on the premises of an independent provider of local phone service, or on the premises of an independent VPN service provider.

Figure 2:
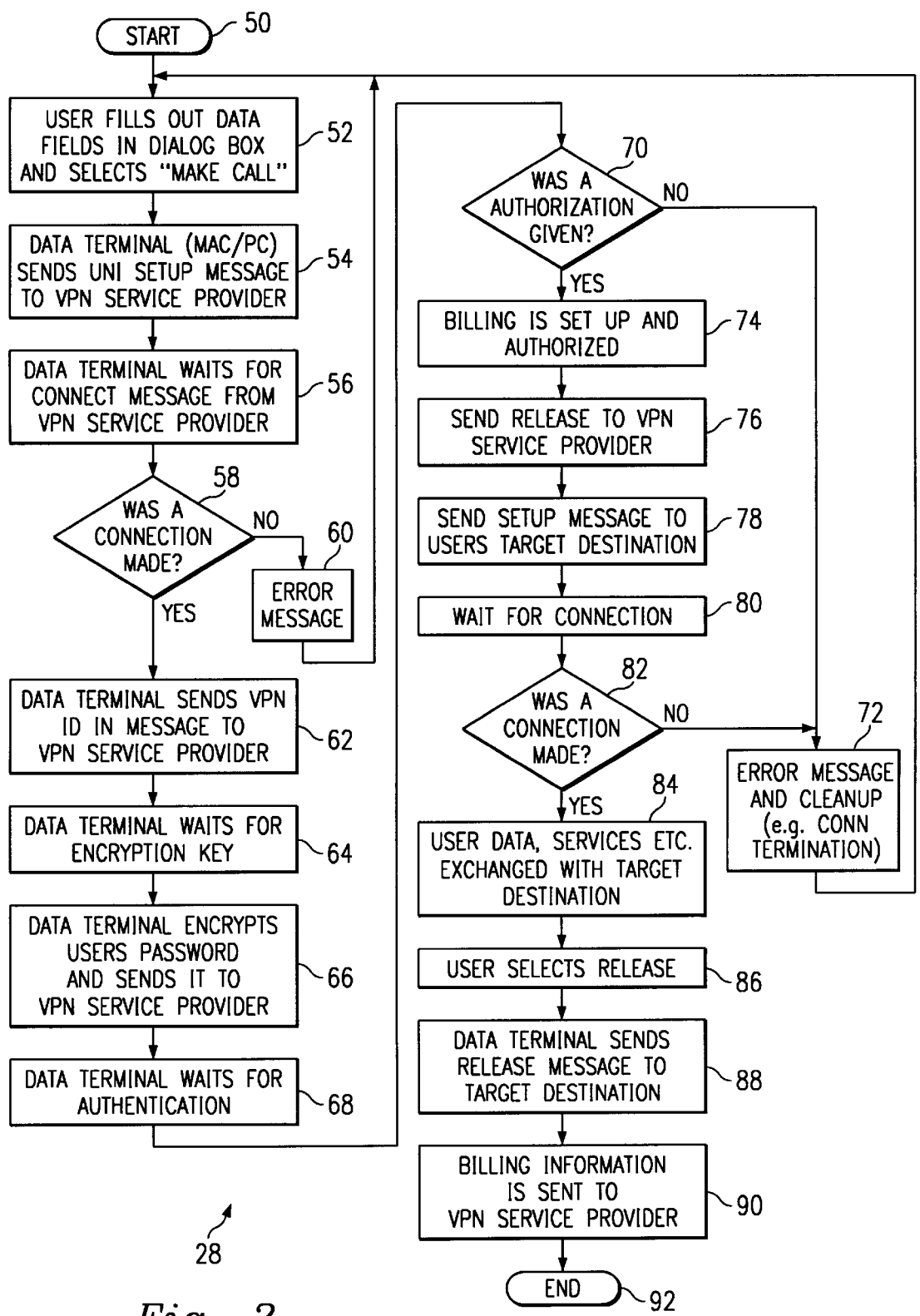
FIG. 2 is a flow chart depicting the method of the present invention, as implemented by application software on a user terminal.

Referring now to FIG. 2, the application software 28 begins the data transfer process in step 50. In step 52, the user is presented with a screen display.

Figure 3:
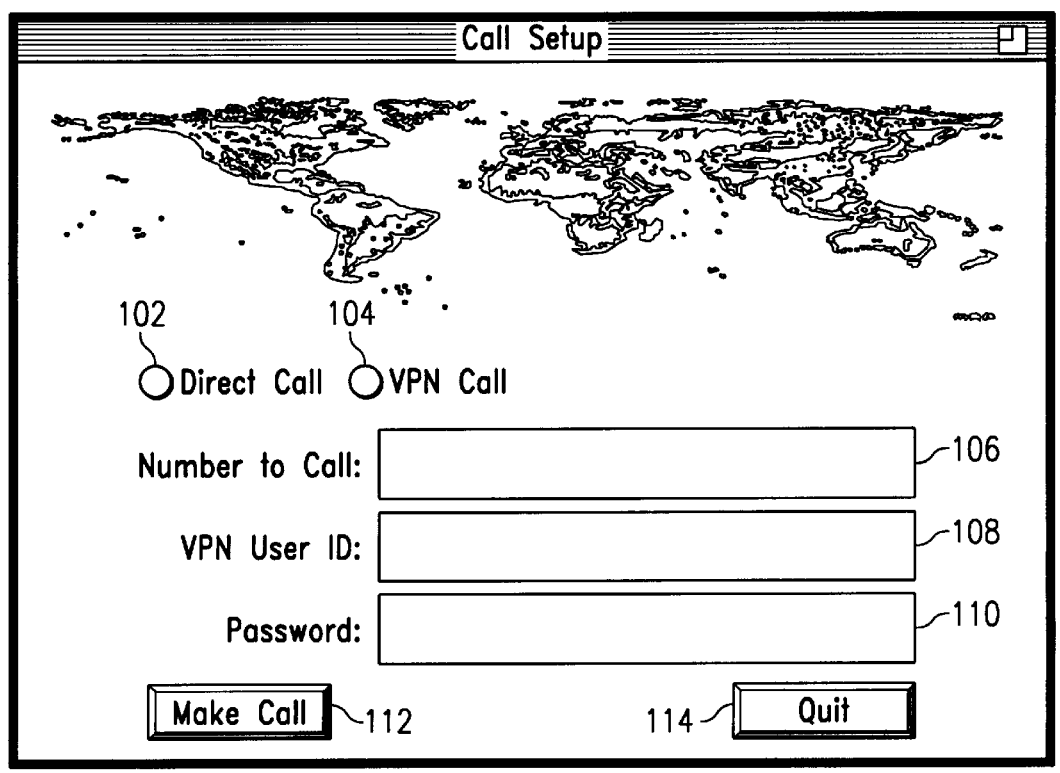
FIG. 3 is the initial screen display of the user interface of the application software.

Referring now to FIG. 3, a screen display 100 displays the following information requests: whether the call is a direct call 102 or a VPN call 104, the number the user desires to call 106, the VPN user ID 108, and the user password 110. The user is also presented with the option to make the call 112, or to quit 114.

Referring back to FIG. 2, in step 54 the user terminal sends to the SCP 32 the information captured through the graphical user interface ("GUI") in step 52 within a user network interface ("UNI") setup message. In step 56 the user terminal 26 waits for a connect message from the SCP 32. In step 58 the user terminal 26 determines if a connection was made. If no connection was made, then in step 60 the user application software 28 displays an error message to the user, and returns to step 50 to begin again the data transfer process.

If a connection was made, then in step 62 the user terminal 26 sends the VPN user ID to the SCP 32. In step 64 the user terminal 26 waits for an encryption key from the SCP 32. In step 66, having received the encryption key from the SCP 32, the user application software 28 encrypts the user's password, and sends it to the SCP 32. In step 68 the user terminal 26 waits for authentication of the user. In step 70 the user application software 28 determines if the SCP 32 authorizes the user to make the call.

If the user is not authorized, then in step 72 the user terminal 26 displays an error message, terminates the connection, blanks the screen display 100, and returns to step 50 to begin again the data transfer process. If the user is authorized, then in step 74 the VPN service provider software 30 sets up the billing, and authorizes it. In step 76 the user terminal 26 sends a "release", meaning to terminate or disconnect the connection, to the SCP 32. In step 78 the user terminal 26 sends a setup message to the number listed by the user as the "number to call", that is, to the final destination. In step 80 the user terminal 26 watts for a connection. In step 82 the user terminal 26 determines if a connection was made.

If a connection to the final destination was not made, then the user application software 28 returns to step 72, in which step the user terminal 26 displays an error message, terminates the connection, blanks the screen display 100, and returns to step 50 to begin again the data transfer process. If a connection to the final destination was made, then in step 84 the user terminal 26 exchanges user data, services, and/or value added or user specific applications with the computer at the address, that is, the telephone number, of the final destination. In step 86 the user selects the option presented to him to release, or terminate, the call. In step 88 the user terminal 26 sends a release message to the final destination. In step 90 the data network 14 sends billing information to the SCP 32. In step 92 the application software 28 ends the data transfer process.

Figure 4A:
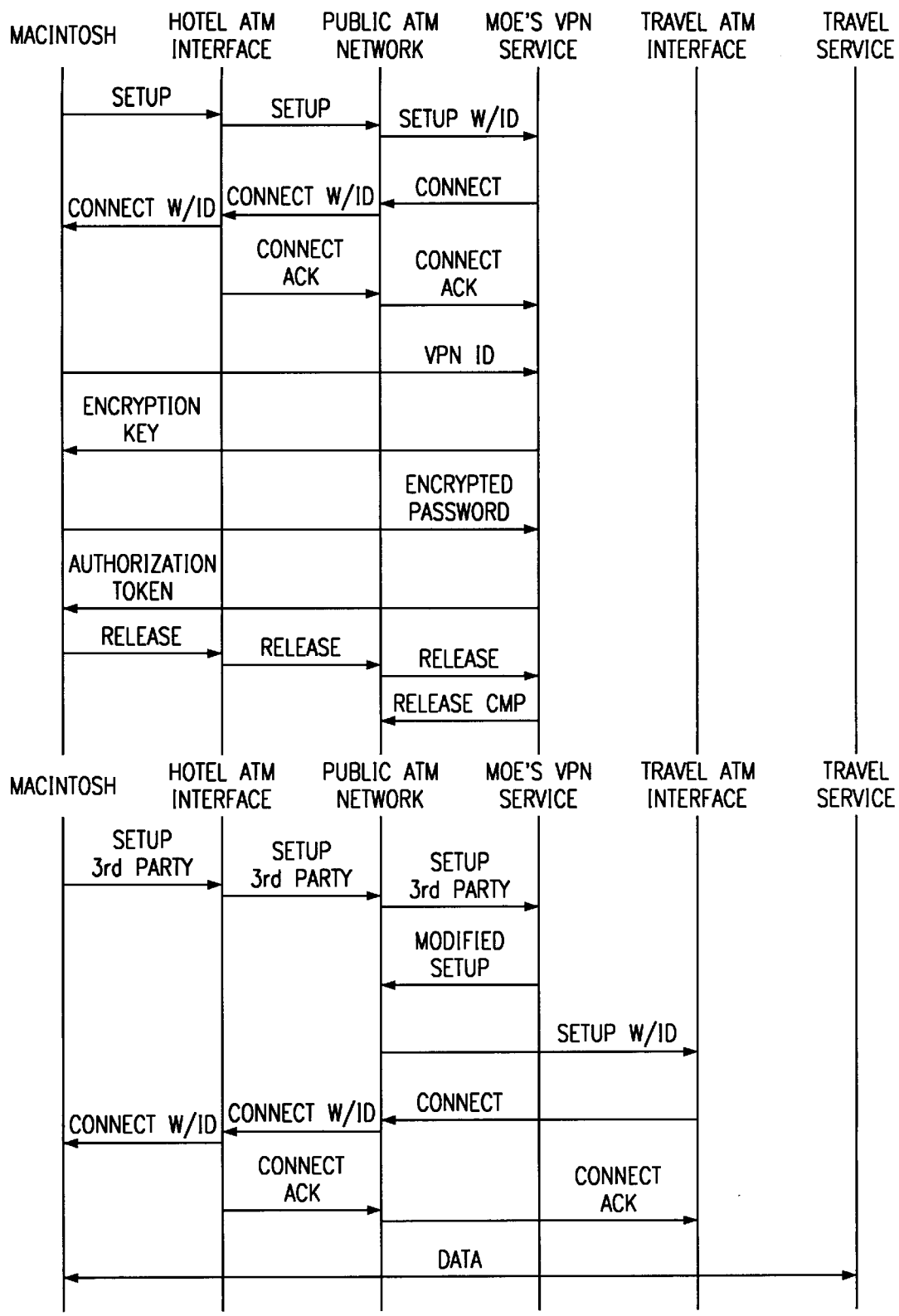

FIG. 4A and FIG. 4B are call flow diagrams, showing the sequence of messages in the method of the preferred embodiment. These diagrams present the same method as the flow chart of FIG. 2. The horizontal arrows represent the messages sent and received. The vertical lines represent the various devices involved in sending and receiving the messages. For example, the top left arrow in FIG. 4A represents a message sent from the user terminal 26, labeled "Macintosh" in FIG.4A, to an interface with a public network. The user terminal 26 can be any brand of a work station computer, a desktop computer, a laptop computer, or even a notebook computer. The interface could be any interface, but in the example of FIG. 4A and FIG. 4B, the interface is imagined to be at a hotel, where a business traveler is using the method of the present invention. Thus, the interface is labeled "Hotel ATM Interface", which is not shown in FIG. 1. The vertical line labeled "Public ATM Network" is the same as the data network 14 in FIG. 1. The vertical line labeled "Moe's VPN Service" represents the VPN service provider software 30 within the SCP 32. The vertical line labeled "Travel ATM Interface" is not shown in FIG. 1, but is located between the called party 22 and the data network 14. The vertical line labeled "Travel Service" is one example of the called party 22 shown in FIG. 1. In the example of FIG. 4A and FIG. 4B, the business traveler is imagined to be using the method of the present invention to contact a travel service to make reservations for his next airline flight. In FIGS. 4A and 4B the designation "Ack" represents "acknowledge", and the designation "Cmp" represents "complete".

Referring now to FIG. 5, the VPN service provider software 30 begins the data transfer process in step 300 by waiting for an event. The event it waits for is a setup message on a signaling port of the SCP 32, to be received from the user terminal 26. In step 302, having monitored the signaling ports, and the SCP 32 having received a setup message, the VPN service provider software 30 assigns a call condense block ("CCB") to the setup message, based on a call reference number. The CCB is a software data structure for tracking resources associated with the call. The call reference number is a number, internal to the SCP, for tracking calls. In step 304 the VPN service provider software 30 compiles the connect message. In step 306 the VPN service provider software 30 sends a connect message to the calling address, that is, the hotel room from which the user is calling. In step 308 the VPN service provider software 30 condenses, that is, it remains in a wait state for that call.

Referring now to FIG. 5B, in step 310 the VPN service provider software 30 waits for an event by monitoring the signaling ports of the SCP 32. After the SCP 32 receives a connect acknowledge message from the user terminal 26, then in step 312 the VPN service provider software 30 accesses the CCB, based on the call reference number. In step 314 the VPN service provider software 30 condenses.

Figure 5C:
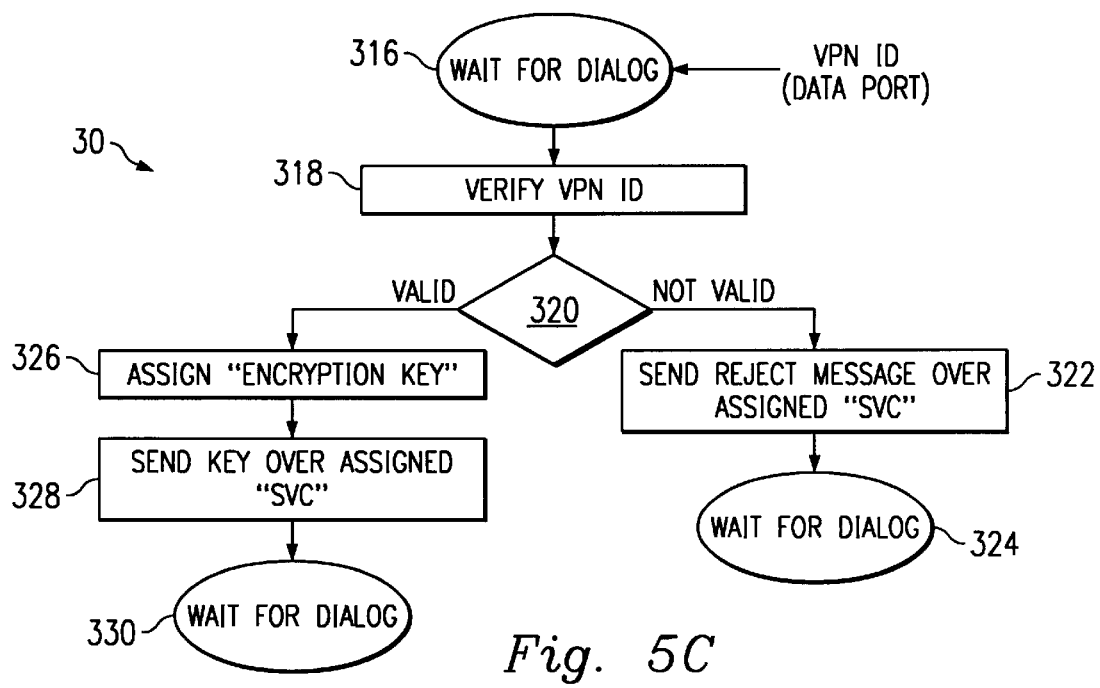

Referring now to FIG. 5C, in step 316 the VPN service provider software 30 waits for dialog on a data port of the SCP 32. After the SCP 32 receives a VPN ID on a data port, the VPN service provider software go verifies the VPN ID in step 318. In step 320 the VPN service provider software 30 determines if the VPN ID is valid. If the VPN ID is not valid, then in step 322 the SCP 32 sends a reject message over an assigned switch virtual circuit ("SVC"). The SVC is a channel over the data network 14. In step 324 the VPN service provider software 30 waits for dialog. In step 326, because the VPN ID is valid, the VPN service provider software 30 assigns an encryption key to the user terminal 26, in step 328 sends the encryption key over the assigned SVC to the user terminal 26, and in step 330 waits for dialog.

Figure 5D:
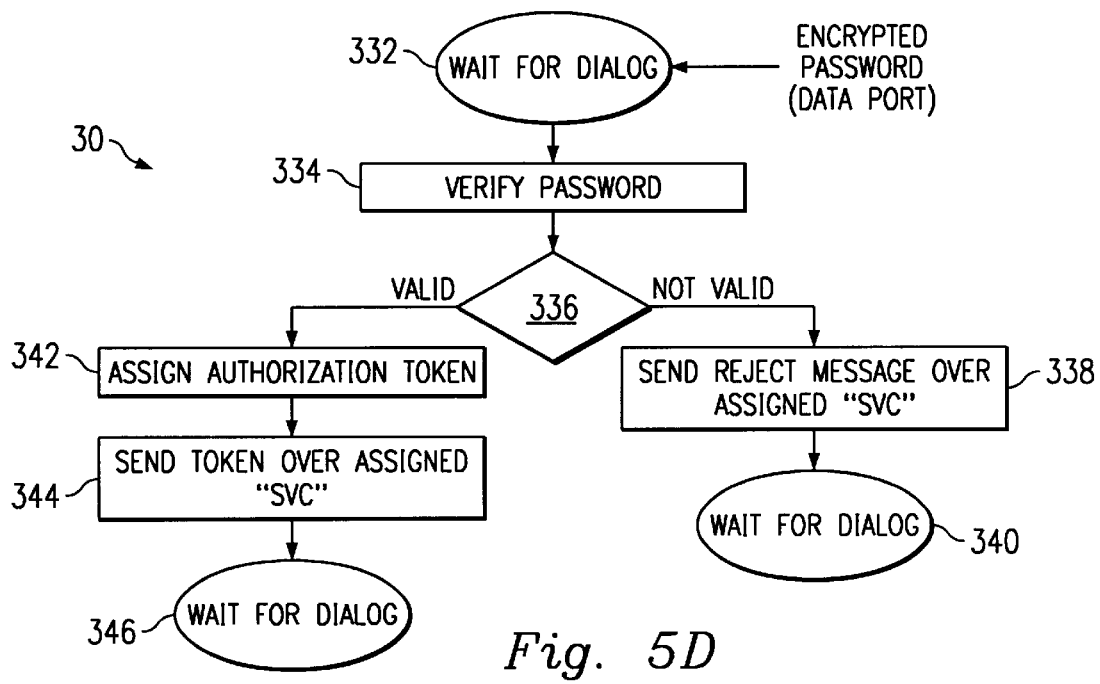

Referring now to FIG. 5D, in step 332 the VPN service provider software 30 waits for dialog. When the SCP 32 receives the encrypted password from the user terminal 26 at a data port, then in step 334 the VPN service provider software 30 verifies the password, and determines in step 336 if the password is valid. If the password is not valid, then in step 338 the SCP 32 sends a reject message over the assigned SVC to the user terminal, and in step 340 waits for dialog. If the password is valid, then in step 342 the VPN service provider software 30 assigns an authorization token to the user terminal 26, in step 344 sends the token over an assigned SVC to the user terminal 26, and in step 346 waits for dialog.

Figure 5E:
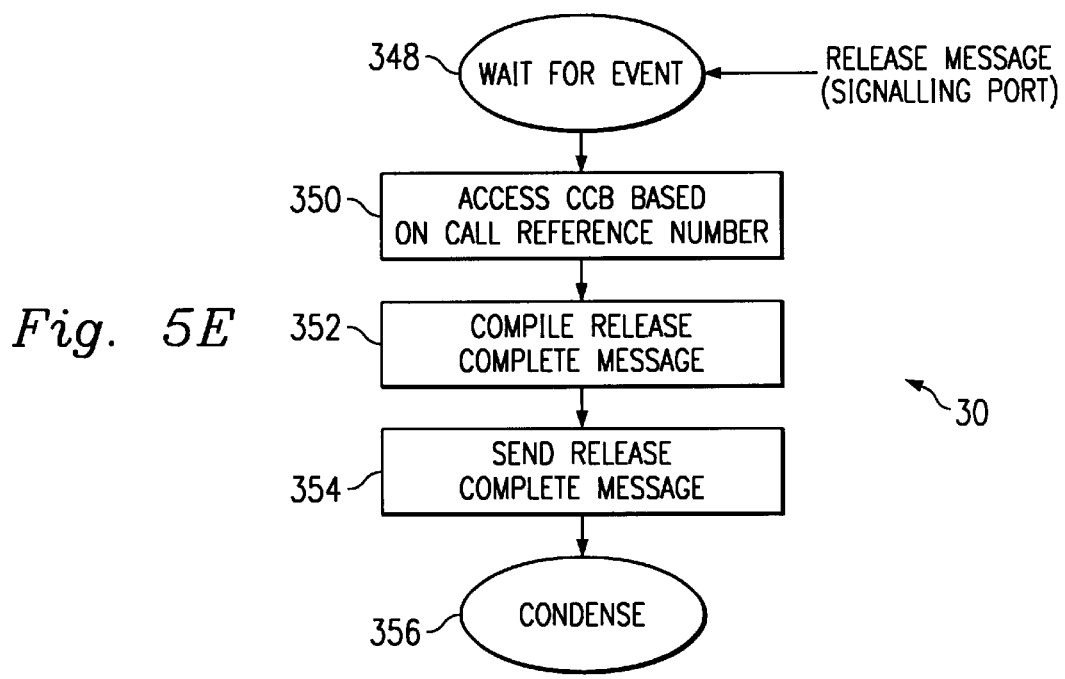

Referring now to FIG. 5E, in step 348 the VPN service provider software 30 waits for an event. When the VPN service provider software 30 senses that the SCP 32 has received on a signaling port a release message from the user terminal 26, then in step 350 the VPN service provider software 30 accesses the CCB, based on the call reference number of the user terminal 26, in step 352 compiles a release complete message, in step 354 sends a release complete message to the user terminal 26, and in step 356 condenses.

Figure 5F:
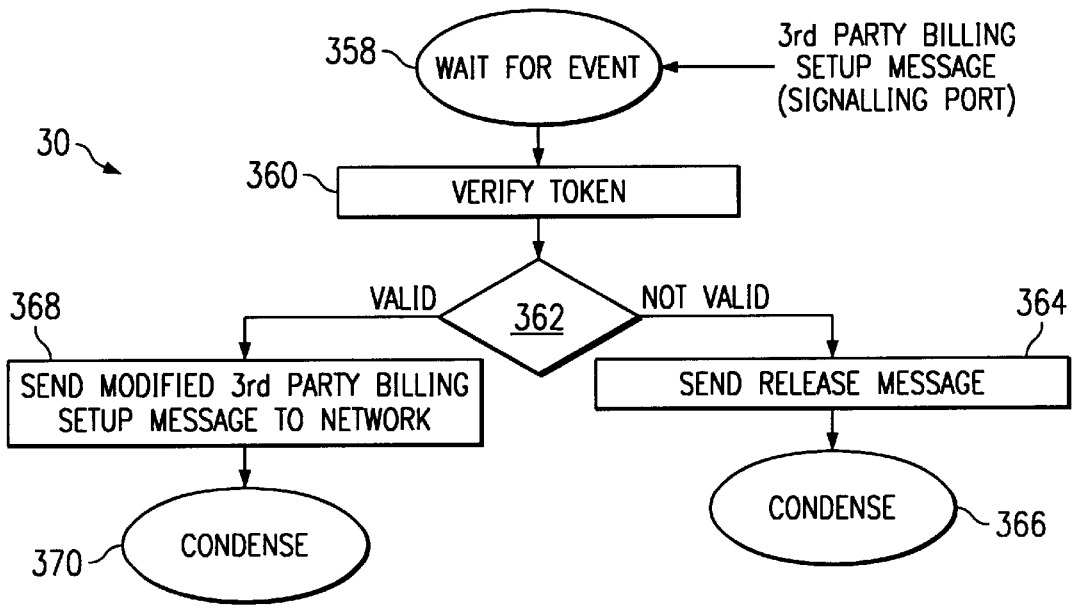

Referring now to FIG. 5F, in step 358 the VPN service provider software 30 waits for an event. When the VPN service provider software 30 senses that the SCP 32 has received on a signaling port a third-party billing setup message from the user terminal 26, then in step 360 the VPN service provider software 30 verifies the token just received from the user terminal 26, to determine, in step 362, if it is the same token that the VPN service provider software 30 sent to the user terminal 26 in step 344. If the token is not valid, then in step 364 the SCP 32 sends a release message to the terminal 26, and in step 366 condenses. If the token is valid, then in step 368 the SCP 32 sends a modified third-party billing setup message to the data network 14, and in step 370 condenses.

Although an illustrative embodiment of the invention has been shown and described, other modifications, changes, and substitutions are intended in the foregoing disclosure. Accordingly, it is appropriate that the appended claims be construed broadly and in a manner consistent with the scope of the invention.

What is claimed is:

1. A computerized method for a virtual private network service provider with third party billing, using a virtual private network to transfer data over a data network to a final destination, the method comprising the steps of:
   a. prompting a user at a data terminal to select a destination, a user identification, a password, and a call type including a choice of the virtual private network;
   b. selecting the virtual private network through the data network;
   c. sending an encryption key to the data terminal;
   d. verifying the password, and providing an authorization code to the user; and
   e. allowing the user to transfer the data through the data network to the final destination, using the authorization code.

2. The method of claim 1, wherein step (d) further comprises negotiating for more bandwidth for the user, and including within the authorization code a grant of additional bandwidth.

3. The method of claim 2, wherein step (c) further comprises encrypting the password to produce an encrypted password, and sending the user identification and the encrypted password to the virtual private network service provider.

4. The method of claim 3, further comprising, after step (a), the step of sending a set-up message to the data network.

5. The method of claim 4, further comprising, after step (c), the step of the virtual private network service provider decrypting the encrypted password.

6. A computer-readable medium encoded with a method of using a virtual private network, with third party billing, the method comprising the steps of:
   a. prompting the user at a data terminal to select a destination, a user identification, a password, and a call type including a choice of the virtual private network;
   b. selecting the virtual private network through the data network;
   c. sending an encryption key to the data terminal;
   d. verifying the password, and providing an authorization code to the user; and
   e. allowing the user to transfer the data through the data network to the final destination, using the authorization code.

7. The computer-readable medium of claim 6 wherein step (d) further comprises negotiating for more bandwidth for the user, and including within the authorization code a grant of additional bandwidth.

8. The computer-readable medium of claim 7 wherein step (c) further comprises encrypting the password to produce an encrypted password, and sending the user identification and the encrypted password to the virtual private network service provider.

9. The computer-readable medium of claim 8 further comprising, after step (a), the step of sending a set-up message to the data network.

10. The computer-readable medium of claim 9 further comprising, after step (c), the step of the virtual private network service provider decrypting the encrypted password.

11. An apparatus for providing a datalink connection from a user terminal to a data network and to a virtual private network, with third party billing, comprising:
   a. means for prompting a user at a data terminal to select a destination, a user identification, a password, and a call type including a choice of the virtual private network;
   b. means for selecting the virtual private network through the data network;
   c. means for sending an encryption key to the data terminal;
   d. means for verifying the password, and providing an authorization code to the user; and
   e. means for allowing the user to transfer data through the data network to a final destination, using the authorization code.

12. The apparatus of claim 11, further comprising means for negotiating for more bandwidth for the user, and including within the authorization code a grant of additional bandwidth.

13. The apparatus of claim 12, further comprising means for encrypting the password to produce an encrypted password, and sending the user identification and the encrypted password to the virtual private network service provider.

14. The apparatus of claim 13, further comprising means for sending a set-up message to the data network.

15. The apparatus of claim 14, further comprising means for decrypting the encrypted password.

* * * * *